Sept. 27, 1938.  H. C. MURRER  2,131,408

TACKLE BOX TRAY

Filed Dec. 29, 1936

INVENTOR.
Herbert C. Murrer
BY Arthur H Robert
ATTORNEY

Patented Sept. 27, 1938

2,131,408

UNITED STATES PATENT OFFICE 2,131,408

TACKLE BOX TRAY

Herbert C. Murrer, Cincinnati, Ohio

Application December 29, 1936, Serial No. 118,138

3 Claims. (Cl. 220—22)

While fishing tackle boxes and the like are variously constructed one form which enjoys wide spread use at the present time, comprises a box having a hinged lid and one or more trays which are connected to both box and lid in such a manner as to move with the lid when the box is closed and opened. In the closed position, where two or more trays are used, the trays are compactly piled in superposed relation so as to rest one upon the other while in the open position they are elevated and moved rearwardly into a "stairway" arrangement which renders the contents of each tray openly accessible. The present invention is directed to an improved form of tray which is particularly suited for, but not at all limited to, use with such type of tackle box.

One important object of the invention is to provide a uniquely simple form of tray which can be easily and quickly manufactured at very low cost.

Another object is to accomplish the foregoing objective in a tray which will not telescope, jam or nest into a lower tray when resting upon it.

A further and important object of the invention is to provide a tray with one or more partitions which may be easily and quickly set into any of a number of predetermined positions to form variously sized compartments that are suited to the particular needs of the user, and, which, while capable of easy and quick removal, are nevertheless so firmly retained in any position to which they may be set, that they are not readily subject to undesirable displacement occasioned accidentally or otherwise.

A tackle box structure embodying my invention is disclosed in the accompanying drawing, wherein.

Figure 1:
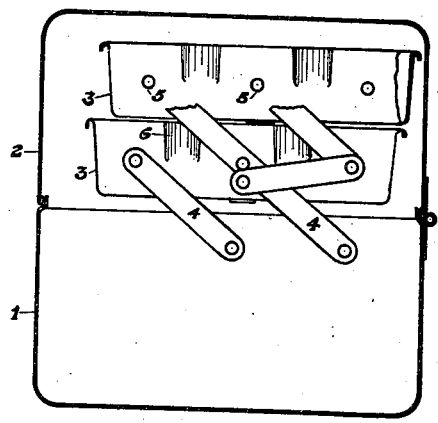
Figure 1 is an end view of a closed tackle box with the end of the box removed to show the superposed relation of the trays and with one of the trays in section.
Figure 3:
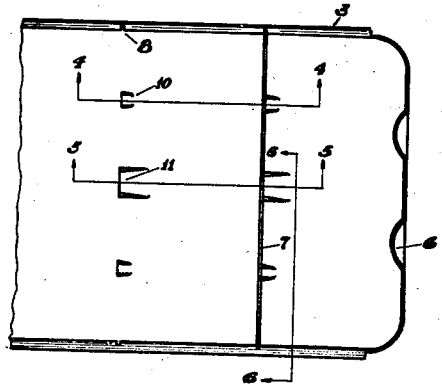
Figure 3 is an enlarged partly broken top plan view of one-half of a single tray, the other half being identical, this tray being shown with a partition in one of the two predetermined positions available in such half.
Figure 2:
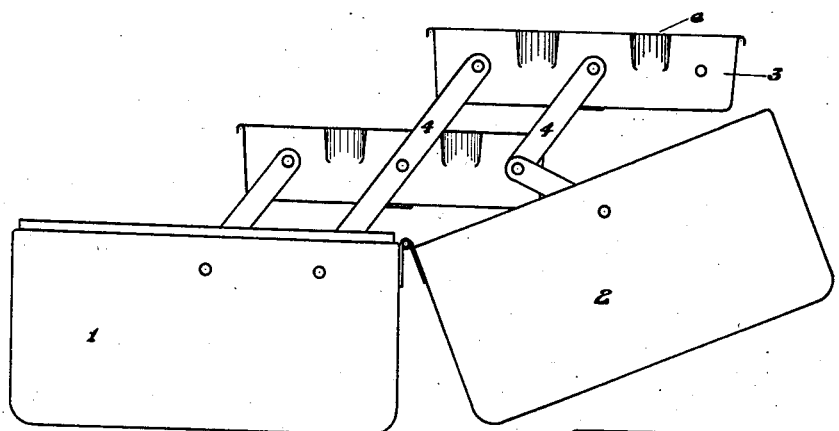
Figure 2 is a view of the end of an open box with the trays in the so called stairway arrangement.
Figure 4:
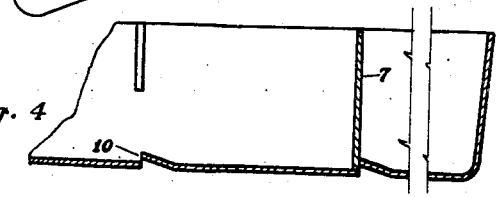
Figure 4 is a longitudinal section along line 4—4 of Figure 3.
Figure 6:
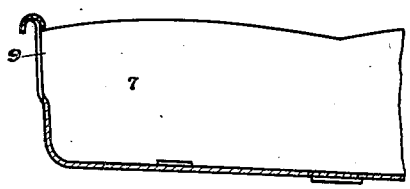
Figure 6 is a transverse section along line 6—6 of Figure 3.
Figure 5:
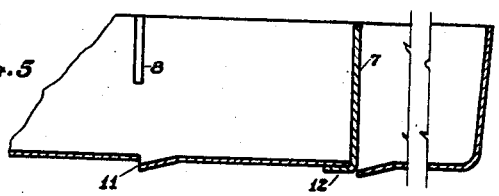
Figure 5 is a longitudinal section along line 5—5 of Figure 3.

The fishing tackle box illustrated in the drawing comprises a box 1 having a hinged lid 2 and a pair of trays 3, which are connected at each end to both the box and lid by an arrangement of links 4 which permit the trays to move with the lid from a superposed or closed position to a stairway or open position.

The trays 3 which preferably are of a long shallow rectangular character may be and preferably are composed of light gauge sheet metal. The end of each tray is provided with a series of openings 5 to receive the pivots by which it is secured to the links 4. The upper edge of each end of the tray is provided with flutes 6 which are made deep enough to keep the trays from nesting when placed one upon the other. The sides of the trays are flared outwardly sufficient to permit the ready removal of the tray-forming die after the tray forming operation.

The trays are adapted to receive a number of partitions 7 which may be manually set transversely across the interior of the trays at any of a number of predetermined positions. Accordingly at each of such predetermined positions, the flared sides of the tray are embossed with opposed grooves 8 which extend from the top vertically downward partway toward but not to the bottom of the tray. These grooves are intended snugly to receive the upper end portion of each partition 7, such end portion being therefore slightly extended beyond the limits of the lower end portion of the partition. The upper end extensions 9 of each partition are such as to require a slight outward springing of the tray sides during the removal or replacement of a partition. To hold the lower horizontal edge of each partition against displacement the bottom of the tray is provided with a pair of spaced nubs 10, which are raised above the plane of the bottom so as to engage one face of a positioned partition, and with lugs 11 which are slanted downwardly below the plane of the bottom so as to form in the bottom a laterally facing opening into which a laterally extending partition tongue 12 may be passed.

In positioning a partition its extended ends are sprung into the grooves while its bottom edge is sprung over the raised nubs as its tongue is slipped into the lug opening. The tongue prevents the nub-engaged face of the partition from receding from the nubs while the latter prevents such face from advancing except when it is sprung thereover. Preferably also the nubs are offset relatively to the tongue to a very slight degree in order to flex the partition slightly in its set position. As a result of this mode of securement each partition is held so firmly that it cannot very well be accidentally displaced and yet at the same time it can be easily and quickly removed when desired. Thus, I avoid in a simple and very practical way the annoyance encountered so often with removable partitions.

Some of the advantages of this structure have been heretofore mentioned. One particular advantage, however, arises from the simple form of the tray which renders it so easy to manufacture. Such form of tray can be completely finished in two operations. In the first operation the flat sheet initially provided is cut and blanked to form the tray proper and to provide it with the bottom nubs 10 and lugs 11 and with straight side edges extending laterally outward. In the second operation the straight side edges are turned downwardly and inwardly and the sides are grooved while the ends are provided with the connector pivot openings 5 and flutes 6.

Having described my invention, I claim:

1. A box tray comprising: a shallow tray member having slightly flared side walls; a removable partition adapted for selective placement across the interior of said tray in either of at least two predetermined positions; a tongue extending laterally from the bottom of said partition; said tray having, in each of its partition receiving positions, side wall means to engage the ends of the partition, raised nubs on its inner bottom face to engage one face of a positioned partition, and a depressed bottom lug which slants downwardly below the bottom plane to form in the bottom a laterally facing opening to receive said tongue; said nubs and tongue being so relatively positioned as to require the partition to be sprung over the nubs in one direction during the insertion of the tongue in said opening, and in the opposite direction during its withdrawal whereby they cooperate to prevent accidental horizontal displacement of said partition in opposite directions.

2. A box tray comprising: a shallow tray member having slightly flared side walls; a removable partition adapted for selective placement across the interior of said tray in either of at least two predetermined positions; a tongue extending laterally from the bottom of said partition; said tray having, in each of its partition receiving positions, opposed side wall grooves into which the ends of said partition may be placed when said side walls are slightly sprung laterally outward, raised nubs on its inner bottom face to engage one face of a positioned partition, and a depressed bottom lug which slants downwardly below the bottom plane to form in the bottom a laterally facing opening to receive said tongue; said nubs and tongue being so relatively positioned as to require the partition to be sprung over the nubs in one direction during the insertion of the tongue in said opening and in the opposite direction during its withdrawal whereby they cooperate to prevent accidental horizontal displacement of said partition in opposite directions.

3. A box tray comprising: a shallow tray member having slightly flared side walls; a removable partition adapted for selective placement across the interior of said tray in either of at least two predetermined positions; a tongue extending laterally from the bottom of said partition; said tray having, in each of its partition receiving positions, opposed grooves which extend vertically downward partway toward the bottom of said tray member and into which the end portions of said partition may be placed when said side walls are slightly sprung laterally outward, raised nubs on the inner bottom face of the tray to engage one face of a positioned partition, and a depressed bottom lug which slants downwardly below the bottom plane to form in the bottom a laterally facing opening to receive said tongue; said partition having a length from one groove engaging end portion to the other which is slightly greater than the distance between opposed grooves; and said nubs and tongue being so relatively positioned and offset as to require the partition to be sprung over the nubs in one direction during the insertion of the tongue in said opening and in the opposite direction during its withdrawal whereby they cooperate to prevent accidental horizontal displacement of said partition in opposite directions and to hold said partition in a slightly flexed condition.

HERBERT C. MURRER.